United States Patent
Van Vooren et al.

(10) Patent No.: US 7,544,128 B2
(45) Date of Patent: Jun. 9, 2009

(54) DISCHARGE SPOUT FOR A FORAGE HARVESTER

(75) Inventors: Sandor W. Van Vooren, Sijsele-Damme (BE); Nick R. M. Vanderstraeten, Kruishoutem (BE); Bernard E. D. Depestel, Oedelem (BE)

(73) Assignee: CNH America LLC, New Holland, PA (US)

( * ) Notice: Subject to any disclaimer, the term of this patent is extended or adjusted under 35 U.S.C. 154(b) by 529 days.

(21) Appl. No.: 11/131,097

(22) Filed: May 17, 2005

(65) Prior Publication Data

US 2006/0046802 A1    Mar. 2, 2006

(30) Foreign Application Priority Data

Sep. 2, 2004   (GB) ................................. 0419478.3

(51) Int. Cl.
*A01F 12/46* (2006.01)
(52) U.S. Cl. .................. 460/114; 460/115; 460/119
(58) Field of Classification Search ................ 56/13.3, 56/16.6, 320.2; 460/111, 114, 115, 119; 406/193
See application file for complete search history.

(56) References Cited

U.S. PATENT DOCUMENTS

| 1,327,377 | A |   | 6/1920  | Dick |
| 1,981,099 | A | * | 11/1934 | Fender ........................ 406/193 |
| 3,110,521 | A | * | 11/1963 | Rogers et al. ................ 406/193 |
| 3,981,125 | A | * | 9/1976  | Kerber et al. ................. 56/14.5 |
| 4,158,279 | A | * | 6/1979  | Jackson ........................ 56/202 |
| 4,974,998 | A | * | 12/1990 | Heineman ..................... 406/97 |
| 5,953,892 | A |   | 9/1999  | Albicker |
| 6,014,903 | A | * | 1/2000  | Strubbe et al. ............ 73/861.73 |
| 2004/0112025 | A1 | * | 6/2004  | Claeys et al. ............. 56/16.4 R |

* cited by examiner

*Primary Examiner*—Alicia M Torres
(74) *Attorney, Agent, or Firm*—Michael G. Harms; John William Stader; Patrick M. Sheldrake

(57) ABSTRACT

A discharge spout is connecting a first end to a discharge tube in a forage harvester to discharge the processed crop from a mouth at a second end into a vehicle driven in use alongside the harvester. The spout has an inspection opening near its first end, a door covering and closing off the inspection opening, and at least one wear plate separate from the door and secured to the inner surface of the door.

5 Claims, 2 Drawing Sheets

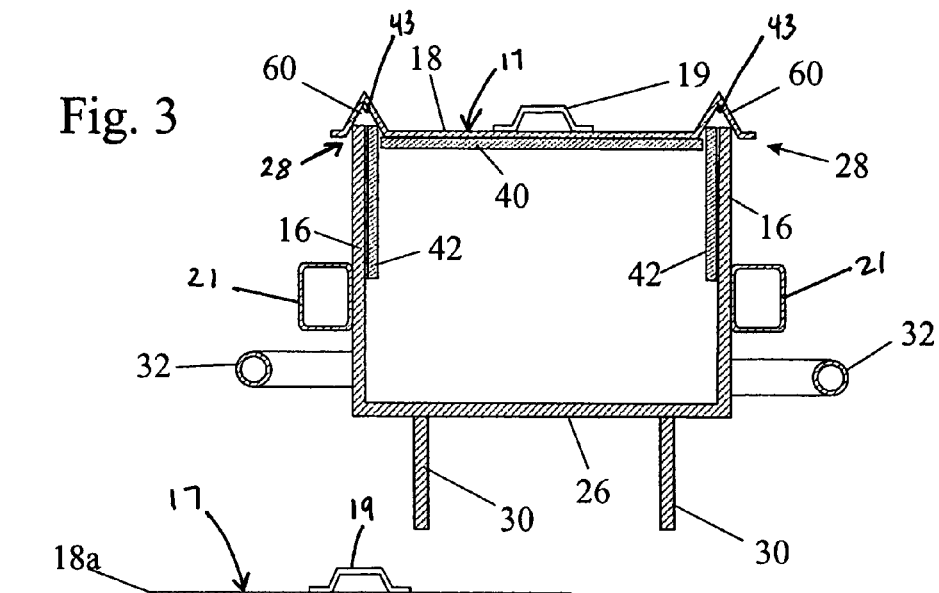
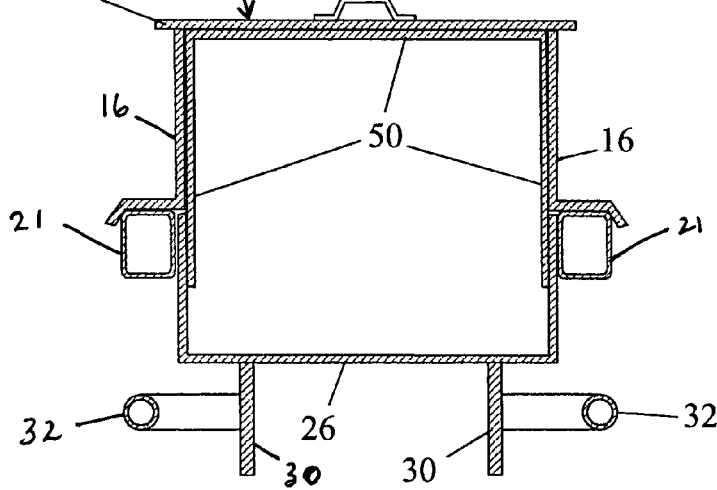
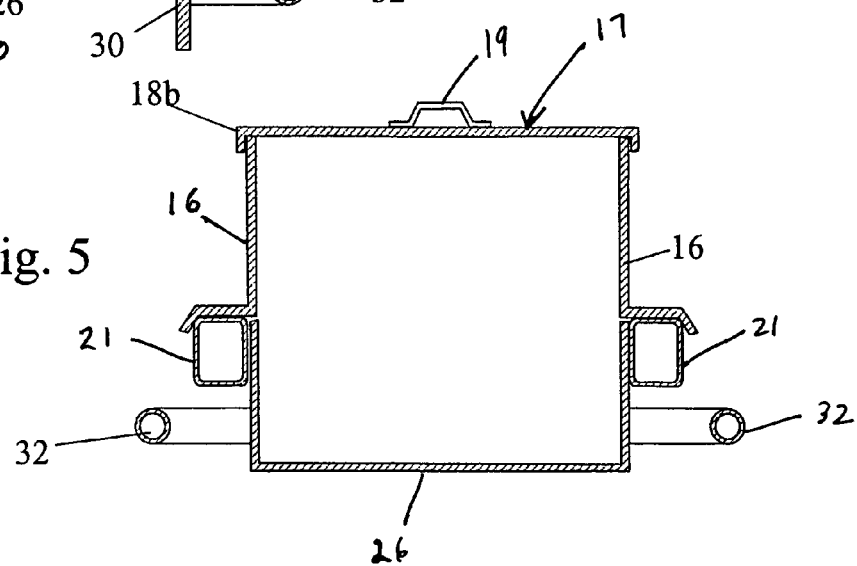
Fig. 3
Fig. 4
Fig. 5

DISCHARGE SPOUT FOR A FORAGE HARVESTER

CROSS REFERENCE TO RELATED PATENT APPLICATIONS

This patent application claims priority under 35 U.S.C. § 119 to GB 0419478.3, filed on Sep. 2, 2004 titled, "Discharge Spout for a Forage Harvester", the full disclosure of which is hereby fully incorporated herein by reference.

FIELD OF THE INVENTION

The present invention relates to a discharge spout for a forage harvester.

BACKGROUND OF THE INVENTION

In a forage harvester, the discharge path for the processed crop commonly comprises a discharge tube and a curved spout connected to the tube. The spout, which can usually be rotated relative to the discharge tube about a vertical axis, projects laterally from one side of the harvester to discharge the processed crop into a container mounted on a vehicle driven alongside the harvester.

Because of the large mass flow rate of the processed crop through the spout, the interior surfaces of the spout are prone to wear. To overcome this problem, it has been proposed previously to provide wear plates to line the parts of the spout that are subjected to the most wear. However, such wear plates were introduced into the spout in the past through its open end or mouth, which made them difficult to assemble and replace.

When harvesting certain types of crop, the speed of the material through the spout can be low, giving rise to a tendency for the spout to become blocked. This is the case, for example, when harvesting low density material such as dried grass. It is therefore desirable to provide the spout with a removable cover, or inspection hatch, especially at the elbow where the spout joins the discharge tube. For this purpose, U.S. Pat. No. 5,953,892 teaches the use of a removable cover that doubles as a replaceable wear plate.

SUMMARY OF THE INVENTION

According to the present invention, there is provided a discharge spout for connection at a first end to a discharge tube in a forage harvester to discharge the processed crop from a mouth at its second end into a vehicle driven alongside the harvester, the spout having an inspection opening near the first end, a door for covering and closing off the inspection opening, and at least one wear plate formed separately from the door and secured to the inner surface of the door.

The present invention recognizes that different requirements govern the design of the door and the wear plate supported by it. For example, in the past, it was desired that the outer cover should, for aesthetic reasons, match the remainder of the spout; manufacturing tolerances can result in mismatched hinge and latch positions whenever they need to be replaced because of wear. By contrast, in the present invention, the door need never be changed and its appearance and fit will therefore remain unaltered when the wear plate is replaced. Furthermore, it is desired that the wear plate be made of a wear resistant material and that it have a smooth surface without projections or interruptions, which can result in crop blockages.

The present invention allows the material of the wear plate to be selected freely to achieve its intended purpose and its shape can be selected at will to avoid internal discontinuities that might otherwise be caused, for example, by the fixings for the door hinge or the door latch.

Preferably, the door is pivotably mounted at one end on the spout and a latch is provided at the other end of the door to hold the door in a closed position covering the inspection opening.

The spout generally has a rectangular cross-section, with a top and a bottom, which are generally horizontal in use, and two sides that are generally vertical in use. Furthermore, it is preferred that the inspection opening be provided in the top of the spout.

In the present invention, the wear plate connected to the door advantageously lines the inner surface of the top of the spout. Additional lateral wear plates are preferably provided to line the inner surfaces of the vertical sides of the spout. Such lateral wear plates may be secured to the vertical sides of the spout and accessed for removal and replacement through the inspection opening. Alternatively, the lateral wear plates may be formed integrally with the wear plate, lining the top of the spout and supported by the door.

In a preferred embodiment of the present invention, the discharge spout is further provided with an auxiliary inspection opening that is contiguous with the first inspection opening and extends the first inspection opening in the direction of the mouth of the spout, the auxiliary inspection opening being covered by a second door that is separate from the door covering the first inspection opening. In this case, one can alternatively regard the spout as having a single inspection opening that is closed by means of a pair of "barn doors" rather that by a single door.

The second door and the first door may be formed in a similar manner to one another, each having secured thereto a separately formed wear plate. However, as the second door is arranged further from the vertical discharge tube, it is not subjected to as much wear as the first and its construction may be modified to take advantage of this fact. Thus, the second door need not carry a wear plate lining the top of the spout. Furthermore, as it will not require frequent replacement, the second door may be formed integrally with two lateral wear plates lining the vertical sides of the spout.

The filling openings for the coolant and hydraulic fluid of certain forage harvesters are located on the top cover of the harvester. When servicing the machine, these locations need to be safely accessible to an operator but because of the movement of the discharge spout during field work, it is difficult to provide a hand grip on the top over of the harvester.

With a view toward mitigating this problem, there is provided in a second aspect of the invention a discharge spout for a forage harvester that is formed integrally with at least one hand grip to steady a person standing on top of the harvester.

Hand grips are preferably provided on both sides of the spout so that at least one hand grip is within reach of a person standing on the top cover of the harvester, regardless of the position of the person on the top cover. It is also desirable to provide two hand grips on each side of the spout, spaced from one another along its length.

BRIEF DESCRIPTION OF THE DRAWINGS

The invention will now be described further, by way of example, with reference to the accompanying drawings, in which:

FIG. 3 is a schematic section through the spout of FIG. 1 in a plane passing through the inspection opening, as designated by lines 3-3 in FIG. 1;

FIG. 4 is a schematic section through the spout of FIG. 2 (a spout having two doors covering the inspection opening), showing an alternative construction of the wear plates lining the top and the sides of the spout, as designated by lines 4-4 in FIG. 2; and FIG. 5 is also a schematic section through the spout of FIG. 2 (a spout having two doors covering the inspection opening), showing the construction of the door remote from the vertical discharge tube, as designated by lines 5-5 in FIG. 2.

DETAILED DESCRIPTION OF THE PREFERRED EMBODIMENTS

Figure 1:
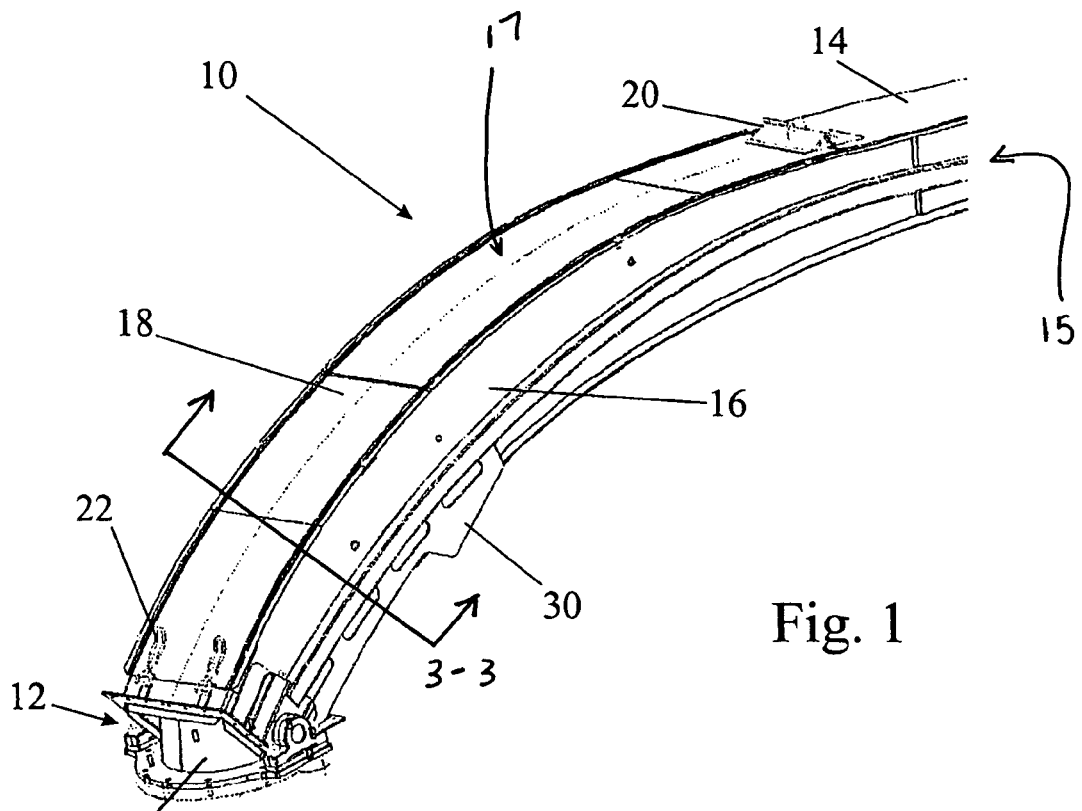
FIG. 1 is a perspective view of a first embodiment of the invention.

FIG. 1 shows a curved spout 10 having one end 12 which is connected to a vertical discharge tube 13 of a forage harvester (not shown). The other end of the spout 10 has a mouth 15 from which the processed crop is discharged into a vehicle driven (not shown) alongside the harvester. The end 12 of the spout 10 is designed to enable the spout 10 to rotate about a vertical axis so that it can discharge the processed crop from either the right or the left side of the harvester.

Figure 2:
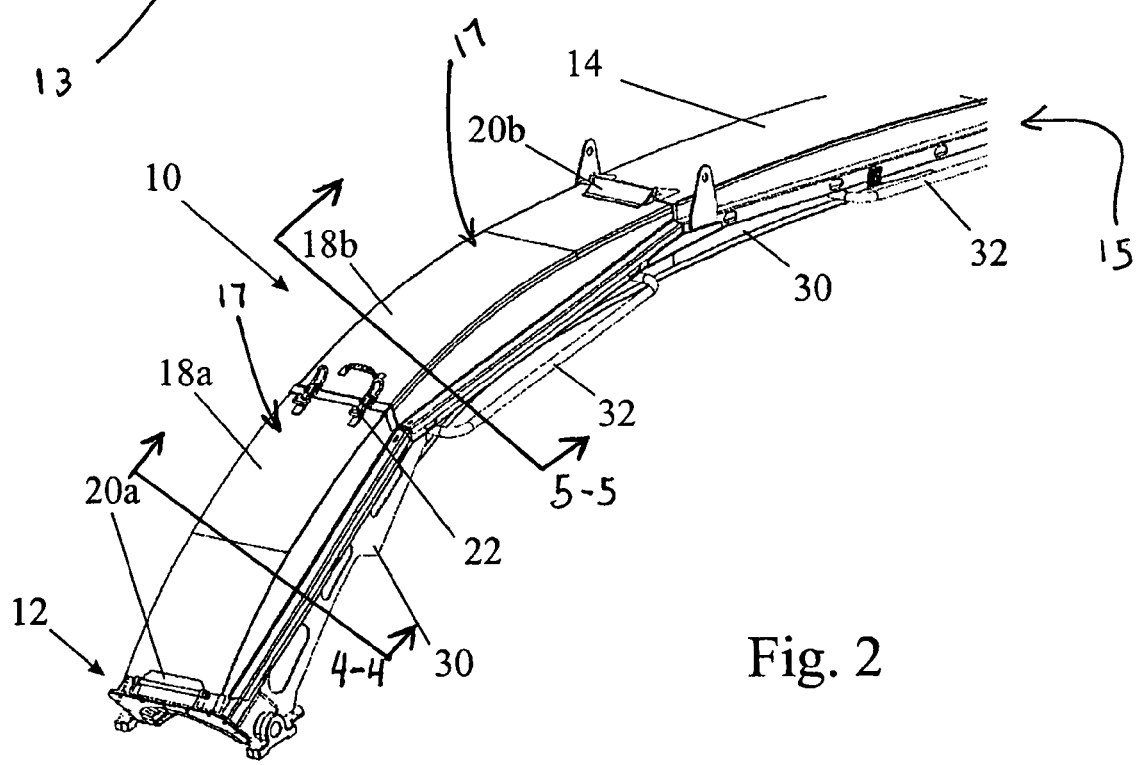
FIG. 2 is a perspective view of a second embodiment of the invention.

The spout 10 has a generally rectangular cross section with a top 14, a bottom and two sides 16, only the top 14 and one side 16 being visible in FIGS. 1 and 2.

Crop moving through the spout 10 subjects the spout 10 to considerable wear, in particular because abrasive particles can be entrained with the crop. For this reason, the spout 10 has internal wear plates (not shown) especially in the impact region of the top 14 that receives the crop leaving the vertical discharge tube 13. It is also possible for the spout 10 to be blocked and to enable unblocking of the spout 10, the spout 10 is provided with an inspection opening 17 that is covered over by means of a door.

In the case of the embodiment of FIG. 1, a single door 18 covers the entire inspection opening 17, the door 18 being pivoted at its end nearer the mouth 15 of the spout 10 about a hinge 20 and having toggle latches 22 at its end nearer the discharge tube 13 to hold it in a closed position.

In the case of the embodiment of FIG. 2, the inspection opening 17 is closed by two barn-style doors 18a and 18b that are pivotable at their outer ends (relative to the discharge tube 13 and mouth 15) about hinges 20a and 20b and are latched to one another in the closed position. In this case, the inspection opening 17 can be regarded as two contiguous openings, one near the vertical discharge tube 13 and the other further removed from it, each opening being closed by its own door. Because the two doors 18a and 18b are subjected to differing degrees of wear, they can be constructed differently as will be explained below.

As shown in the sections of FIGS. 3 to 5, the bottom 26 and the sides 16 of the spout 10 are formed as a U-shaped channel with two box sections 21 reinforcing the sides. A door 18 closes off and seals the U-shaped channel to prevent the processed crop from escaping when the door 18 is closed. Two stiffening ribs 30 are welded to the bottom 26 of the spout 10 and two hand grips 32 project laterally either from the sides of the U-shaped channel (as shown in FIGS. 3 and 5) or from the stiffening ribs 30 (as shown in FIG. 4).

As can be seen from FIG. 2, two such hand rails 32 may be provided on each side of the spout 10, being staggered along the length of the spout 10 to allow one of the hand rails 32 to be within the reach of a person standing on any part of the top cover of the harvester (not shown). The sections of FIGS. 3 to 5 also show that the door 18 can be fitted with a handle 19 to assist in opening it.

The construction of the door 18 and the wear plates shown in FIG. 3 is applicable either to the single door 18 of FIG. 1 or the door 18a nearer the vertical discharge tube 13 in the embodiment of FIG. 2. In this case, a top wear plate 40 is releasably secured to the door 18 and two side wear plates 42 are releasably secured to the sides 16 of the spout 10, these being accessible for removal and replacement through the inspection opening 17 covered by the door 18.

The method by which the wear plates 40 and 42 are attached to the door 18 and the sides 16 of the spout 10 is not shown in the drawing but it may simply involve the use of screw fastenings, rivets, adhesives, or other similar fastening materials to hold the wear plates 40 and 42 in place. The wear plates 40 and 42 and their fastenings should be designed to present a smooth surface to the processed crop without any upstream facing projections or steps that would present an obstruction to the smooth flow of the crop.

In FIG. 3, a labyrinth seal 28 is used to seal the spout 10 to prevent the crop from escaping. The seal 28 is formed by two V-shaped ribs 60 that are pressed out of the cover 18. The upper edges of the sides of the U-shaped channel and the side wear plates 42 are received within the internal grooves 43 defined by these two ribs 60. This construction not only creates a labyrinth that prevents egress of the crop but also squeezes the side wear plates 42 against the sides 16 of the channel to prevent the crop from penetrating between them. As the cover 18 is curved, the ribs 60 also act as stiffening ribs so that the cover 14 can sit firmly over the sides 16 of the channel. In addition, such a sealing does not require any tooling for fastening or releasing of the cover 18.

FIG. 4 shows an alternative construction that is applicable to the same doors 18a and 18b. In this case, a single U-shaped wear plate 50 is secured to the door 18a to line the door 18a and the sides 16 of the spout 10. The advantage of this construction is that it simplifies the replacement of the wear plates 50 when they are worn. As the wear plate 50 is of a U-shaped form, it provides the cover 18a with the sufficient stiffness and in this case the need for a labyrinth seal 28 does not arise.

The second door 18b (see FIG. 5) in the embodiment of FIG. 2 can be constructed in the same manner as described above with regard to the first door 18a. Such a construction is however not necessary because the second door 18b is not subjected to excessive wear being positioned further from the vertical discharge tube 13 of the harvester. It is therefore preferred for the second door 18b to be as shown in the section of FIG. 5, which is similar to that of FIGS. 3 and 4. In this case, it is possible to dispense entirely with the wear plate 50 protecting the underside of the door 18b. Optionally, side wear plates may be secured permanently to the door 18b. Such a construction is permissible in the case of the second door 18b because it will not require frequent replacement.

What is claimed is:

1. A discharge spout for connection at a first end to a discharge tube in a forage harvester to discharge processed crop from a mouth at its second end into a vehicle driven alongside the harvester, wherein the discharge spout comprises a rectangular cross-section having a top and a bottom which are generally horizontal in use and two sides that are generally vertical during use, the discharge spout comprising:

an inspection opening near the first end, wherein the inspection opening is provided in the top of the discharge spout;

a first door covering and closing off the inspection opening; and at least one wear plate formed separately from the door and secured to the inner surface of the door, wherein the at least one wear plate connected to the door lines the inner surface of the top of the discharge spout, wherein additional lateral wear plates are provided to line the inner surfaces of the vertical sides of the discharge spout, wherein the lateral wear plates are secured to the vertical sides of the discharge spout and are accessible for removal and replacement through the inspection opening, further wherein the door is formed with two pressed out ribs each defining a groove receiving the upper edges of the two vertical sides of the discharge spout and of the lateral wear plates, so as to define labyrinth seals, the labyrinth seals preventing separation of the lateral wear plates from the vertical sides of the discharge spout.

2. A discharge spout as claimed in claim 1, wherein the door is pivotably mounted at one end on the discharge spout and a latch is provided at the other end of the door to hold the door in a closed position covering the inspection opening.

3. A discharge spout as claimed in claim 1, further comprising:

at least one hand grip, the at least one hand grip allowing a person to steady oneself when standing on top of the harvester, wherein the at least one hand grip is of integral construction with the discharge spout.

4. A discharge spout as claimed in claim 3, wherein the discharge spout further comprises:

said two sides comprising a first vertical side and a second vertical side; and said at least one hand grip comprising a first hand grip and a second hand grip, the first hand grip located on the first vertical side of the discharge spout and the second hand grip is located on the second vertical side of the discharge spout, at least one of the first hand grip and the second hand grip being within reach of a person standing on the top cover of the harvester, regardless of the position of the person on the top cover.

5. A discharge spout as claimed in claim 4, further comprising:

a third hand grip and a fourth hand grip, the first and third hand grips being affixed to the first vertical side of the discharge spout and the second and fourth hand grips being affixed to the second vertical side of the discharge spout.

\* \* \* \* \*